UNITED STATES PATENT OFFICE 1,981,145

PROCESS OF PRODUCING PHOSPHORIC ACID

Cornelius H. Keller, San Francisco, Calif., assignor to Minerals Separation North American Corporation, New York, N. Y., a corporation of Maryland No Drawing. Application October 21, 1933, Serial No. 694,639

8 Claims. (Cl. 23—165)

The present invention relates generally to the production of phosphoric acid in the form of ortho-phosphoric acid and has for some of its objects to provide for simplicity in the extraction of this acid from phosphate-containing materials and for purity and strength of the acid recovered. As herein described in connection with the examples given, the invention is applied to Florida phosphate rock concentrates.

An important feature of the invention is the provision of an improved procedure for the recovery of ortho-phosphoric acid from phosphate-containing materials, wherein comparatively low temperatures are used and ortho-phosphoric acid is produced without admixture with the other forms of phosphoric acid namely meta-phosphoric acid and pyro-phosphoric acid.

The treatment of the flotation concentrates may commence with decomposition by sulphuric acid. The pulp thus formed contains, besides ortho-phosphoric acid, other products, including lime salts, particularly calcium sulphate. In accordance with the invention, the usual water leach may be omitted, the ortho-phosphoric acid in the pulp being dissolved or leached out by the use of a water-miscible organic solvent having a boiling point lower than that of water. It will be readily understood from the examples given that the miscibility of the solvent with water may vary within wide limits, but the solvents claimed are all appreciably miscible with water, and miscibility is to be understood with reference to these examples. Ketones, alcohols, ethers and esters are included in the group of solvents having the properties mentioned, and in this group acetone has been found particularly satisfactory. The leaching may be carried out by the well-known continuous counter-current method, or other suitable method. The material leached out in this matter is ortho-phosphoric acid substantially free from lime salts, and it does not contain impurities which are difficult to remove. Procedures according to this invention, however, provide other distinct advantages, one of which is the easy removal of the solvent by evaporation. Further, the organic solvent is evaported at a temperature which does not convert the ortho-phosphoric acid into meta-phosphoric acid and/or pyro-phosphoric acid.

The solution of ortho-phosphoric acid in the organic solvent is removed from the solid residue, as by filtration, and its subsequent treatment with activated carbon has been found very effective in freeing it from suspended organic matter. Among the contaminants which may be contained in phosphatic material, arsenic is considered the most deleterious. The filtrate may be freed from this substance, if necessary, by precipitation as sulphide. The subsequent treatment with activated carbon removes in one operation the organic matter, the precipitated arsenic trisulphide and any excess hydrogen sulphide used. Part of the organic solvent may be evaporated prior to the removal of the contaminants, and the remaining part driven off after the removal of the contaminants.

Any water-soluble calcium phosphate remaining as part of the residue or filter cake obtained by filtration of the leached phosphoric acid, can be recovered by a water leach.

As a preferred procedure, the ortho-phosphoric acid pulp resulting from the decomposition of the raw material may be first subjected to the usual water leach. The liquor thus formed contains ortho-phosphoric acid and soluble lime salts. After the separation of this liquor from the solid matter, it is concentrated by evaporation and then treated with the organic solvent for extraction of the ortho-phosphoric acid. This procedure has the advantage that the amount of organic solvent required to extract the ortho-phosphoric acid from the impure concentrated liquor is less than that required for directly treating the pulp with the organic solvent.

Should purification from arsenic, etc., be required, this may be accomplished when the ortho-phosphoric acid is in solution in water prior to concentration, or when it is in solution in the organic solvent prior to evaporation of the solvent.

Further features and advantages of the invention will appear in the following examples.

*Example 1.*—Five portions of Florida phosphate concentrate, each weighing 50 grams, were each treated with a mixture of 23.5 cubic centimeters of concentrated sulphuric acid and 23.5 cubic centimeters of water. This amount of sulphuric acid was less than that required for the complete decomposition of the phosphate present, thereby preventing contamination of the ortho-phosphoric acid produced with free sulphuric acid. The resultant pulps were left standing in an air-oven at a temperature of from 110° C. to 120° C. for five hours. The material was then allowed to cool and "ripen" for 18 hours. The charges were then removed from the oven and one of them was mechanically agitated for 15 minutes with 250 cubic centimeters of acetone. The resulting acetone solution of ortho-phosphoric acid was filtered by suction and the filter cake washed with acetone. For each of the remaining charges, the procedure of extracting the ortho-phosphoric acid was the same, but utilized as the solvent the acetone solution resulting from the charge previously treated. The acetone in the filtrate from the last charge to so undergo treatment was driven off by evaporation, and the material at this stage was left in the air-oven at a temperature of from 110° C. to 120° C. for 18 hours, after which a black, syrupy mass of ortho-phosphoric acid was obtained.

For recovering the water-soluble products in the residues or filter cakes resulting from the acetone leaching, the filter cake resulting from the charge first leached by acetone, was mechanically agitated with 250 cubic centimeters of water, the resulting solution being then filtered and the filter cake washed with water. The same procedure was carried out for each of the remaining batches, utilizing, however, as the extracting liquid the filtrate obtained by treatment of the preceding batch. The final solution, or filtrate, resulting from the last of the batches to be so treated, was then evaporated to dryness.

The results are shown in the following table:

|  | Weight in grams | Assay calculated as $H_3PO_4$ | Contents calculated as $H_3PO_4$ | Contents calculated as $H_3PO_4$ |
| --- | --- | --- | --- | --- |
|  |  | Per cent | Grams | Per cent |
| Florida phosphate concentrate | 250.00 | 45.82 | 114.55 |  |
| Acetone leach | 96.50 | 89.25 | 86.12 | 75.18 |
| Water leach | 39.00 | 40.12 | 15.65 | 13.66 |
| Filter cake tails | 315.00 | 1.58 | 4.98 | 4.35 |
| Unaccounted for |  |  | 7.80 | 6.81 |
|  |  |  |  | 100.00 |

The acetone-leached ortho-phosphoric acid was free from sulphuric acid and lime salts, but contained considerable organic matter. The solution from water-leaching contained calcium monophosphate and some calcium sulphate and was only slightly discolored. These products may be separated by well-known and appropriate methods.

*Example 2.*—As the acid resulting from the acetone leaching in the first test contained organic matter, the procedure of this example included the removal of this organic matter. Four portions of 50 grams each of Florida concentrate were treated as in Example 1. The filtrate obtained by leaching with acetone, was evaporated down to approximately 250 cubic centimeters. The resulting dark brown solution of ortho-phosphoric acid in acetone was agitated in a flask with 20 grams of so-called "Norit A" activated carbon. This was continued intermittently during the day. The material was then left standing over night. It was then filtered and the residue washed with acetone. The resulting filtrate was only slightly discolored. It was evaporated in an open dish on a water bath and left over night in the air-oven at a temperature of from 110° C. to 120° C. The resulting acid was still slightly discolored, but was easily cleared by the addition of a very small amount of sodium chlorate, which oxidized the remaining organic matter. The residues obtained by the acetone leaching were extracted with water, as previously described.

The following table indicates the results of this second example:

|  | Weight in grams | Assay calculated as $H_3PO_4$ | Contents calculated as $H_3PO_4$ | Contents calculated as $H_3PO_4$ |
| --- | --- | --- | --- | --- |
|  |  | Per cent | Grams | Per cent |
| Florida phosphate concentrate | 200.00 | 46.03 | 92.06 |  |
| Acetone leach before adding sodium chlorate | 71.50 | 89.26 | 63.82 | 69.32 |
| Water leach | 20.00 | 71.00 | 14.20 | 15.42 |
| Filter cake tails | 25.50 | 2.38 | 6.07 | 6.60 |
| Unaccounted for |  |  | 7.97 | 8.66 |
|  |  |  |  | 100.00 |

The cleared ortho-phosphoric acid after chlorate treatment, contained no sulphuric acid.

*Example 3.*—The Florida concentrate used in the aforesaid examples assayed 0.0012% $As_2O_3$ and the ortho-phosphoric acid recovered assayed 0.0008% of this substance. A third procedure was carried out as a result of which the product was freed from this contaminant. Thus, 150 grams of Florida concentrate were decomposed and processed as before, in three equal portions of 50 grams each, to extract the ortho-phosphoric acid by acetone leaching. The liquor was evaporated down to approximately 200 cubic centimeters, $H_2S$ gas was bubbled through the concentrated liquor for several minutes, after which 30 grams of "Norit A" were introduced. The material was left standing for 18 hours with an accasional shaking. It was then filtered by suction, no $H_2S$ odor being perceived. Most of the acetone was distilled off at ordinary pressure from a water bath, this taking approximately twenty minutes. Suction was then applied for fifteen minutes, and the temperature in the distilling flask was allowed to rise to 95° C. The resulting acid was cleared up with sodium chlorate and assayed. The ortho-phosphoric acid content was 90.8%. It contained no arsenic.

Tests showed that the acetone used as solvent in the process of the present invention, can be recovered with but a slight loss by the use of simple and inexpensive condensation equipment.

*Example 4.*—Here 200 grams of Florida phosphate concentrate were decomposed by sulphuric acid in amount less than that required for the complete decomposition of the phosphate present, and the decomposed material was dried and allowed to ripen, all as described in connection with preceding examples. The resulting material was mechanically agitated with methylethylketone. The liquor was filtered and the ketone evaporated. This resulted in the material marked "Acid" in the following table. The residue was similarly agitated with water, the material resulting from evaporation of the water from the filtered solution being marked "$H_2O$ soluble" in the table. The material marked "Final residue" is the residue from the water leaching.

|  | Weight in grams | Assay calculated as $H_3PO_4$ | Contents calculated as $H_3PO_4$ | Contents calculated as $H_3PO_4$ | $SO_3$ |
|---|---|---|---|---|---|
|  |  | Per cent | Grams | Per cent | Per cent assay |
| Florida phosphate concentrate | 200.00 | 46.10 | 92.20 |  |  |
| Acid | 51.0 | 81.4 | 41.5 | 45.0 | Nil |
| $H_2O$ soluble | 45.0 | 74.6 | 33.9 | 36.8 | 4.87 |
| Final residue | 237.0 | 4.3 | 10.2 | 11.1 |  |
| Unaccounted for |  |  | 6.6 | 7.1 |  |
|  |  |  |  | 100.0 |  |

*Example 5.*—The procedure was the same as in Example 4, except that ethylacetate was used as the solvent. The results are given in the following table, in which the significance of the terms in the first column is the same as in the table of Example 4.

|  | Weight in grams | Assay calculated as $H_3PO_4$ | Contents calculated as $H_3PO_4$ | Contents calculated as $H_3PO_4$ | $SO_3$ |
|---|---|---|---|---|---|
|  |  | Per cent | Grams | Per cent | Per cent assay |
| Florida phosphate concentrate | 200.00 | 46.10 | 92.2 |  |  |
| Acid | 36.0 | 85.1 | 30.7 | 33.3 | Nil |
| $H_2O$ soluble | 67.5 | 72.3 | 48.8 | 53.0 | 2.98 |
| Final residue | 236.0 | 2.6 | 6.1 | 6.6 |  |
| Unaccounted for |  |  | 6.6 | 7.1 |  |
|  |  |  |  | 100.0 |  |

*Example 6.*—The procedure was the same as in Example 4, except that methylacetate was used as the solvent. The following table shows the results.

|  | Weight in grams | Assay calculated as $H_3PO_4$ | Contents calculated as $H_3PO_4$ | Contents calculated as $H_3PO_4$ | $SO_3$ |
|---|---|---|---|---|---|
|  |  | Per cent | Grams | Per cent | Per cent assay |
| Florida phosphate concentrate | 200.00 | 46.10 | 92.20 |  |  |
| Acid | 42.50 | 91.90 | 39.05 | 42.40 | Nil |
| $H_2O$ soluble | 60.50 | 70.92 | 42.90 | 46.50 | 4.50 |
| Final residue | 235.00 | 3.10 | 7.29 | 7.90 |  |
| Unaccounted for |  |  | 2.90 | 3.20 |  |
|  |  |  |  | 100.00 |  |

*Example 7.*—Here methylformate was used to extract the ortho-phosphoric acid from a material obtained by decomposing 100 grams of Florida phosphate concentrate. Except for this, the procedure was the same as before. The following results were obtained:

|  | Weight in grams | Assay calculated as $H_3PO_4$ | Contents calculated as $H_3PO_4$ | Contents calculated as $H_3PO_4$ | $SO_3$ |
|---|---|---|---|---|---|
|  |  | Per cent | Grams | Per cent | Per cent assay |
| Florida phosphate concentrate | 100.00 | 46.1 | 46.1 |  |  |
| Acid | 27.0 | 83.9 | 22.65 | 48.8 | Nil |
| $H_2O$ soluble | 29.0 | 68.8 | 19.95 | 43.0 | 1.9 |
| Final residue | 122.0 | 3.1 | 3.78 | 8.2 |  |
|  |  |  |  | 100.0 |  |

*Example 8.*—The procedure was the same as in the preceding example, except that methylal was used as the solvent, the results being as follows:

|  | Weight in grams | Assay calculated as $H_3PO_4$ | Contents calculated as $H_3PO_4$ | Contents calculated as $H_3PO_4$ | $SO_3$ |
|---|---|---|---|---|---|
|  |  | Per cent | Grams | Per cent | Per cent assay |
| Florida phosphate concentrate | 100.0 | 46.1 | 46.10 |  |  |
| Acid | 27.9 | 81.8 | 22.82 | 49.5 | Nil |
| $H_2O$ soluble | 26.0 | 68.7 | 17.86 | 38.7 | 5.5 |
| Final residue | 122.0 | 2.9 | 3.54 | 7.7 |  |
| Unaccounted for |  |  | 1.88 | 4.1 |  |
|  |  |  |  | 100.0 |  |

A detailed procedure which may be followed when it is desired to first subject the decomposed material to the usual water leach for removal of all of the water-soluble products and to then treat the concentrated water solution with an organic solvent for extraction of the ortho-phosphoric acid, is given in the following example.

*Example 9.*—200 grams of Florida phosphate concentrate were decomposed by sulphuric acid in an amount less than that required for complete decomposition of the phosphate present, as heretofore described. The decomposed material was leached with water, the solution was filtered and the residue washed with water. The liquor thus obtained was heated in the air-oven for sixteen hours whereupon a heavy mush-like mass resulted. This material was then removed from the oven, acetone was added to it, and it was left to soak with the acetone for several hours, with occasional stirring. Agitation as in the earlier examples, was not used, as it was found that prolonged standing permitted the finely divided particles of gypsum to settle and the liquor formed to be easily filtered. The residue obtained by filtration, composed in large part of calcium phosphate and gypsum, was washed with acetone. It was then dried. The filtrate, composed of ortho-phosphoric acid in solution in acetone, was concentrated by evaporation, resulting in the product termed "Acid" in the following table:

|  | Weight in grams | Assay calculated as $H_3PO_4$ | Contents calculated as $H_3PO_4$ | Contents calculated as $H_3PO_4$ | $SO_3$ |
|---|---|---|---|---|---|
|  |  | Per cent | Grams | Per cent | Per cent assay |
| Florida phosphate concentrate | 200.0 | 46.1 | 92.2 |  |  |
| Acid | 80.0 | 88.4 | 53.04 | 57.5 | Nil |
| Calcium phosphate | 47.0 | 57.6 | 27.07 | 29.4 | 11.9 |
| Residue from $H_2O$ leach | 245.0 | 1.5 | 3.68 | 4.0 |  |
| Unaccounted for |  |  | 8.41 | 9.1 |  |
|  |  |  |  | 100.0 |  |

The ortho-phosphoric acid solution in acetone can be treated as heretofore described for removal of organic matter and arsenic. If iron is present, this contaminant can be removed by addition of potassium ferrocyanide to the solution. If desired, all of these impurities can be removed from the aqueous solution of ortho-phosphoric acid obtained by water-leaching.

*Examples 10 and 11.*—Similar procedures were carried out, using, respectively, ethylalcohol and methylalcohol for extracting the ortho-phosphoric acid from the liquor obtained by first leaching the decomposed material with water. The products obtained by these procedures, including the crude acid and the filter cake, were of similar appearance and approximately of the same weight as by the procedure of Example 9, wherein acetone was used as the solvent.

In all of the preceding examples the amount of sulphuric acid used in the decomposition of the phosphate was less than that required for complete decomposition of the phosphate present. This resulted in products containing no free sulphuric acid. While such contaminant is objectionable when the ortho-phosphoric acid is used for food purposes, its presence is not at all deleterious, nor does it diminish the market value of ortho-phosphoric acid, when used as a fertilizer material. Therefore, when the ortho-phosphoric acid is to be used for fertilizer purposes, a greater amount of sulphuric acid may be used to decompose the phosphatic material, resulting in greater amount of free ortho-phosphoric acid soluble in organic solvents. This is demonstrated by the following examples:

Example 12.—50 grams of Florida phosphate concentrate were treated with a mixture of 25.5 cubic centimeters of water and 25.5 cubic centimeters of concentrated sulphuric acid, this amount of sulphuric acid being slightly in excess of that required for complete reaction. The decomposed material was heated and allowed to ripen, as heretofore described. It was then mechanically agitated with acetone, and was filtered. The acetone was evaporated, resulting in the material marked "Acid" in the following table. The residue was similarly agitated with water, the solution was filtered and the water was evaporated, resulting in the material marked "$H_2O$ soluble" in the table. The material marked "Residue" is the residue from the water leaching.

| | Weight in grams | Assay calculated as $H_3PO_4$ | Contents calculated as $H_3PO_4$ | Contents calculated as $H_3PO_4$ | $SO_3$ |
|---|---|---|---|---|---|
| | | Per cent | Grams | Per cent | Per cent assay |
| Florida phosphate concentrate | 50.00 | 46.1 | 23.05 | | |
| Acid | 27.07 | 77.4 | 20.95 | 90.9 | 5.2 |
| $H_2O$ soluble | 5.0 | 15.9 | 0.79 | 3.4 | |
| Residue | 60.0 | 0.7 | 0.42 | 1.8 | |
| Unaccounted for | | | 0.89 | 3.9 | |
| | | | | 100.0 | |

Example 13.—A similar procedure was carried out with methylacetate as the solvent, the following results being obtained:

| | Weight in grams | Assay calculated as $H_3PO_4$ | Contents calculated as $H_3PO_4$ | Contents calculated as $H_3PO_4$ | $SO_3$ |
|---|---|---|---|---|---|
| | | Per cent | Grams | Per cent | Per cent assay |
| Florida phosphate concentrate | 50.00 | 46.10 | 23.05 | | |
| Acid | 25.48 | 80.2 | 20.43 | 88.7 | 2.33 |
| $H_2O$ soluble | 5.00 | 17.20 | 0.86 | 3.7 | |
| Residue | 61.00 | 0.60 | 0.37 | 1.6 | |
| Unaccounted for | | | 1.39 | 6.0 | |
| | | | | 100.0 | |

Example 14.—A similar procedure was carried out with ethylether as a solvent, resulting in an extraction of 79.8% of an acid of 91.08% strength.

Examples 15 and 16.—Propylether and isopropylether gave similar results but with lower recoveries.

It is to be understood that this invention is not limited to the specific procedures given in the foregoing examples.

What I claim is:

1. In a process of producing ortho-phosphoric acid wherein a phosphate-containing material is decomposed to form ortho-phosphoric acid in admixture with other products, the step consisting in leaching out ortho-phosphoric acid formed by such decomposition with acetone.

2. In a process of producing ortho-phosphoric acid wherein a phosphate-containing material is decomposed to form ortho-phosphoric acid in admixture with other products, the steps consisting in contacting the decomposed material with acetone, separating the resulting liquor from the solid material, and recovering other water-soluble products from said solid material by water leaching.

3. In a process of producing ortho-phosphoric acid wherein a material containing tri-calcium phosphate is treated with sulphuric acid to form ortho-phosphoric acid in admixture with water-soluble calcium phosphate and calcium sulphate, the steps consisting in recovering ortho-phosphoric acid from the decomposed material by leaching it with acetone, and recovering soluble calcium phosphate by leaching the residue with water.

4. In a process of producing ortho-phosphoric acid wherein a phosphate-containing material is decomposed to form ortho-phosphoric acid in admixture with other products, the steps consisting in leaching out ortho-phosphoric acid formed by such decomposition with acetone, and recovering ortho-phosphoric acid from the resulting liquor by evaporation of the acetone.

5. In a process of producing ortho-phosphoric acid wherein a phosphate-containing material is decomposed to form ortho-phosphoric acid in admixture with other products and in which ortho-phosphoric acid and other water-soluble products are leached out by water from the decomposed material, the steps consisting in concentrating the solution containing ortho-phosphoric acid and other water-soluble products, and extracting ortho-phosphoric acid from the concentrated material by means of a solvent comprising one of the substances of the group containing acetone, methylethylketone, ethylacetate, methylacetate, methylformate, methylal, ethylalcohol, methylalcohol, ethylether, propylether and isopropylether.

6. In a process of producing ortho-phosphoric acid wherein a phosphate-containing material is decomposed to form ortho-phosphoric acid in admixture with other products and in which ortho-phosphoric acid and other water-soluble products are leached out by water from the decomposed material, the steps consisting in concentrating the solution containing ortho-phosphoric acid and other water-soluble products, and extracting ortho-phosphoric acid from the concentrated material by means of acetone.

7. In a process of producing ortho-phosphoric acid wherein a phosphate-containing material is decomposed to form ortho-phosphoric acid in admixture with other products and in which ortho-phosphoric acid and other water-soluble products are leached out by water from the decomposed material, the steps consisting in concentrating the solution containing ortho-phosphoric acid and other water-soluble products, contacting the concentrated material with a solvent comprising one of the substances of the group containing acetone, methylethylketone, ethylacetate, methylacetate, methylformate, methylal, ethylalcohol, methylalcohol, ethylether, propylether and isopropylether, separating the solution of ortho-phosphoric acid in the solvent from the solid material, and evaporating and recovering the organic solvent from said solution.

8. In a process of producing ortho-phosphoric acid wherein a phosphate-containing material is decomposed to form ortho-phosphoric acid in admixture with other products and in which ortho-phosphoric acid and other water-soluble products are leached out by water from the decomposed material, the steps consisting in concentrating the solution containing ortho-phosphoric acid and other water-soluble products, contacting the concentrated material with acetone, separating the solution of ortho-phosphoric acid in acetone from the solid material, and evaporating and recovering the acetone from said solution.

CORNELIUS H. KELLER.